(12) United States Patent
Matsuda et al.

(10) Patent No.: US 11,143,439 B2
(45) Date of Patent: Oct. 12, 2021

(54) HEAT PUMP WITH REFRIGERANT LEAK DETECTION AND PUMP-DOWN METHOD

(71) Applicant: Mitsubishi Electric Corporation, Tokyo (JP)

(72) Inventors: Takuya Matsuda, Tokyo (JP); Makoto Wada, Tokyo (JP); Yuji Motomura, Tokyo (JP); Katsuhiro Ishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 103 days.

(21) Appl. No.: 16/485,500

(22) PCT Filed: Mar. 13, 2017

(86) PCT No.: PCT/JP2017/009896
§ 371 (c)(1),
(2) Date: Aug. 13, 2019

(87) PCT Pub. No.: WO2018/167811
PCT Pub. Date: Sep. 20, 2018

(65) Prior Publication Data
US 2019/0390876 A1 Dec. 26, 2019

(51) Int. Cl.
*F25B 1/04* (2006.01)
*F24F 11/36* (2018.01)
(Continued)

(52) U.S. Cl.
CPC ............. *F25B 1/04* (2013.01); *F16K 11/10* (2013.01); *F24F 11/36* (2018.01); *F25B 49/02* (2013.01); *F25B 2500/222* (2013.01)

(58) Field of Classification Search
CPC ..... F16K 11/10; F25B 2500/222; F25B 49/02
See application file for complete search history.

(56) References Cited

U.S. PATENT DOCUMENTS 4,179,894 A * 12/1979 Hughes ............... F24D 11/0221
  62/79
4,516,408 A * 5/1985 Chiba ..................... F25B 13/00
  62/238.7

(Continued)

FOREIGN PATENT DOCUMENTS

EP  3279580 A1  2/2018
EP  3467406 A1  4/2019
(Continued)

OTHER PUBLICATIONS

Extended European Search Report dated Feb. 10, 2020 issued in the corresponding EP application No. 17900469.2.
(Continued)

*Primary Examiner* — Henry T Crenshaw
(74) *Attorney, Agent, or Firm* — Posz Law Group, PLC

(57) ABSTRACT

A refrigeration cycle apparatus includes a gas leakage sensor and a control device. When refrigerant leakage is detected by the gas leakage sensor, the control device performs a first mode operation to operate a compressor in such a state that a four-way valve is set to a cooling operation state, an expansion valve is opened, and a first shutoff valve is closed. After performing the first mode operation, the control device performs a second mode operation to operate the compressor in such a state that the four-way valve is set to a heating operation state and the first shutoff valve is closed.

12 Claims, 11 Drawing Sheets

(51) Int. Cl.
  *F16K 11/10*     (2006.01)
  *F25B 49/02*     (2006.01)

(56) References Cited

U.S. PATENT DOCUMENTS

| | | | | |
|---|---|---|---|---|
| 2013/0180690 | A1* | 7/2013 | Yura | F24F 3/065 |
| | | | | 165/121 |
| 2015/0027144 | A1* | 1/2015 | Lee | F24D 19/1087 |
| | | | | 62/80 |
| 2018/0142931 | A1* | 5/2018 | Takagi | F25B 49/022 |

FOREIGN PATENT DOCUMENTS

| | | | |
|---|---|---|---|
| JP | S62-77769 U | | 5/1987 |
| JP | H05-118720 A | | 5/1993 |
| JP | 2007-178026 A | | 7/2007 |
| JP | 2007-178026 | * | 7/2012 |
| JP | 2013-122364 A | | 6/2013 |
| JP | 6081033 B | | 2/2017 |
| WO | 2016/157519 A1 | | 10/2016 |

OTHER PUBLICATIONS

Office Action dated Aug. 4, 2020 issued in the counterpart JP Patent Application No. 2019-505309 (and English translation).
International Search Report of the International Searching Authority dated May 23, 2017 for the corresponding international application No. PCT/JP2017/009896 (and English translation).

* cited by examiner

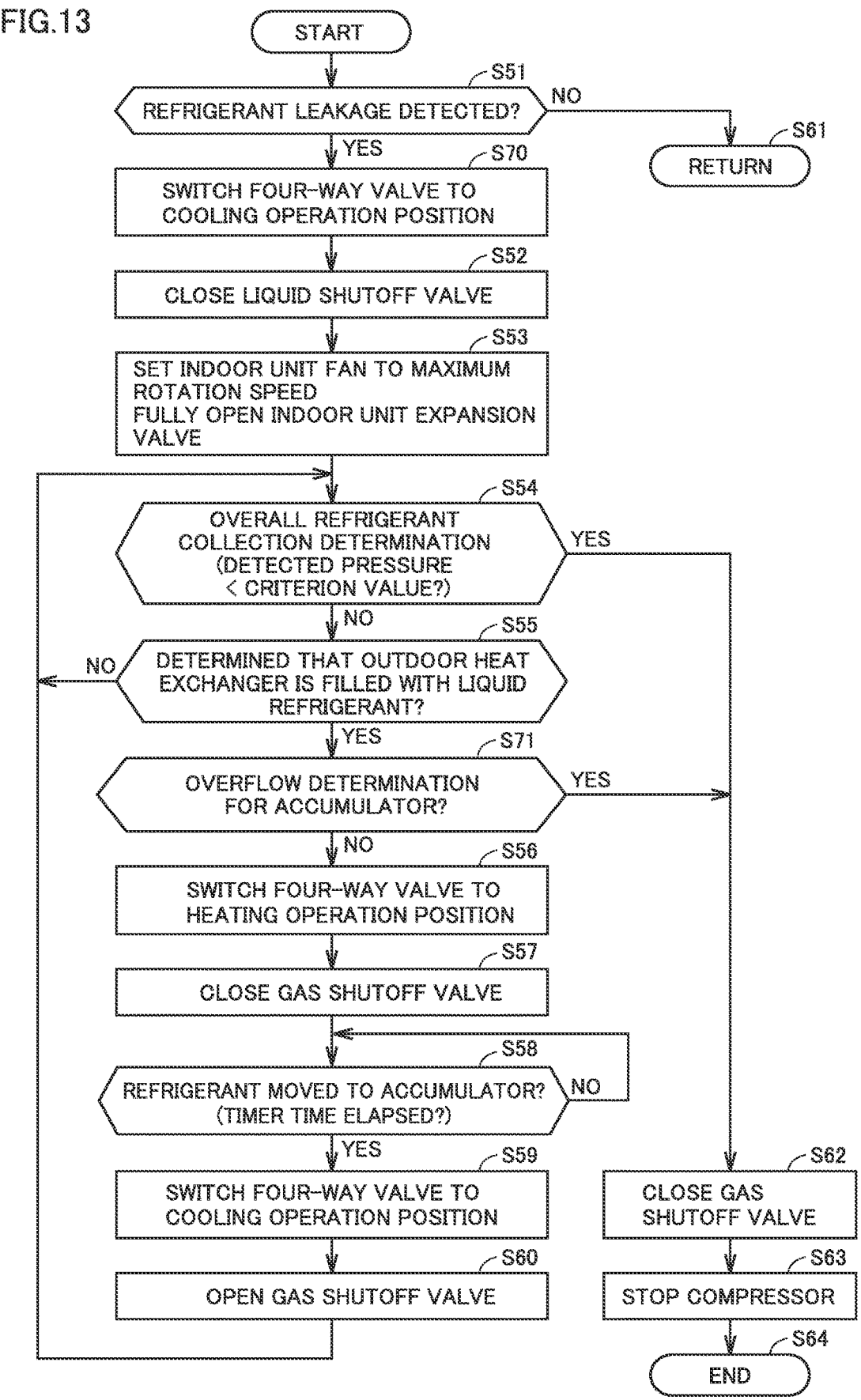

HEAT PUMP WITH REFRIGERANT LEAK DETECTION AND PUMP-DOWN METHOD

CROSS REFERENCE TO RELATED APPLICATION

This application is a U.S. national stage application of International Application PCT/JP2017/009896, filed on Mar. 13, 2017, the contents of which are incorporated herein by reference.

TECHNICAL FIELD

The present invention relates to a refrigeration cycle apparatus, particularly, a refrigeration cycle apparatus configured to perform a pump down operation during leakage of a refrigerant.

BACKGROUND

A pump down operation is an operation intended to move a refrigerant in an indoor unit and pipes, each of which connects the indoor unit to an outdoor unit, to inside of the outdoor unit by operating a compressor with a liquid shutoff valve being closed. Generally, the pump down operation is often performed to existing devices when renewing or relocating air conditioners and refrigerators.

Japanese Patent Laying-Open No. 5-118720 (Patent Literature 1) discloses a refrigeration apparatus configured to minimize an amount of refrigerant released to inside of a room or atmospheric air even when the refrigerant is leaked due to failure of the refrigeration apparatus. This refrigeration apparatus is provided with: a leakage detection device configured to detect leakage of the refrigerant; and open-close valves provided at two pipes that connect an indoor unit to an outdoor unit. In this refrigeration apparatus, when the leakage detection device detects leakage of the refrigerant, the pump down operation is performed. In the pump down operation, one open-close valve provided at the pipe is closed first, a refrigerant collection operation is performed, and then the other open-close valve is closed.

PATENT LITERATURE

PTL 1: Japanese Patent Laying-Open No. 5-118720

However, when each of the pipes for the refrigerant that connect the outdoor unit to the indoor unit is long and when a large number of indoor units are connected to one outdoor unit, an amount of refrigerant sealed in a refrigerant circuit becomes large. If the pump down operation is performed when the amount of refrigerant is thus large, an outdoor heat exchanger is filled with a liquid refrigerant. This may lead to a so-called liquid sealed state.

The liquid sealed state refers to a state in which an amount of gas refrigerant in a heat exchanger becomes very small and the heat exchanger is filled with a liquid refrigerant. In this state, the liquid refrigerant may be evaporated in response to an increase of temperature to cause abrupt pressure increase upon expansion, with the result that the heat exchanger may be damaged.

SUMMARY

An object of the present invention is to provide a refrigeration cycle apparatus so as to suppress an outdoor heat exchanger from being brought into a liquid sealed state during a pump down operation.

A refrigeration cycle apparatus according to the present embodiment includes a outdoor heat exchanger, a compressor, an accumulator, an indoor heat exchanger, an expansion valve, a four-way valve, a refrigerant circuit, a first shutoff valve, and a refrigerant leakage detection device. The four-way valve is connected to an outlet of the compressor, an inlet of the accumulator, the outdoor heat exchanger, and the indoor heat exchanger. The refrigerant circuit is configured to circulate a refrigerant through the compressor, the outdoor heat exchanger, the expansion valve, and the indoor heat exchanger. The first shutoff valve is provided between the outdoor heat exchanger and the expansion valve in the refrigerant circuit. The refrigerant leakage detection device is configured to detect refrigerant leakage from the refrigerant circuit.

In the refrigeration cycle apparatus, when the refrigerant leakage is detected by the refrigerant leakage detection device, a first mode operation is performed to operate the compressor in such a state that the refrigerant circulates in order of the compressor, the outdoor heat exchanger, the first shutoff valve, the expansion valve, the indoor heat exchanger, and the accumulator, the expansion valve is opened, and the first shutoff valve is closed, and after performing the first mode operation, a second mode operation is performed to operate the compressor in such a state that the refrigerant circulates in order of the compressor, the indoor heat exchanger, the expansion valve, the first shutoff valve, the outdoor heat exchanger, and the accumulator, and the first shutoff valve is closed.

According to the present invention, by switching the four-way valve to the heating operation position, the outdoor heat exchanger is connected to the accumulator in the refrigerant flow path, and the liquid refrigerant stored in the outdoor heat exchanger is moved into the accumulator, whereby liquid sealing in the outdoor heat exchanger can be prevented.

BRIEF DESCRIPTION OF DRAWINGS

FIG. 13 is a flowchart for illustrating the pump down operation performed in the modification of the second embodiment during the heating operation.

DETAILED DESCRIPTION

Figure 1:
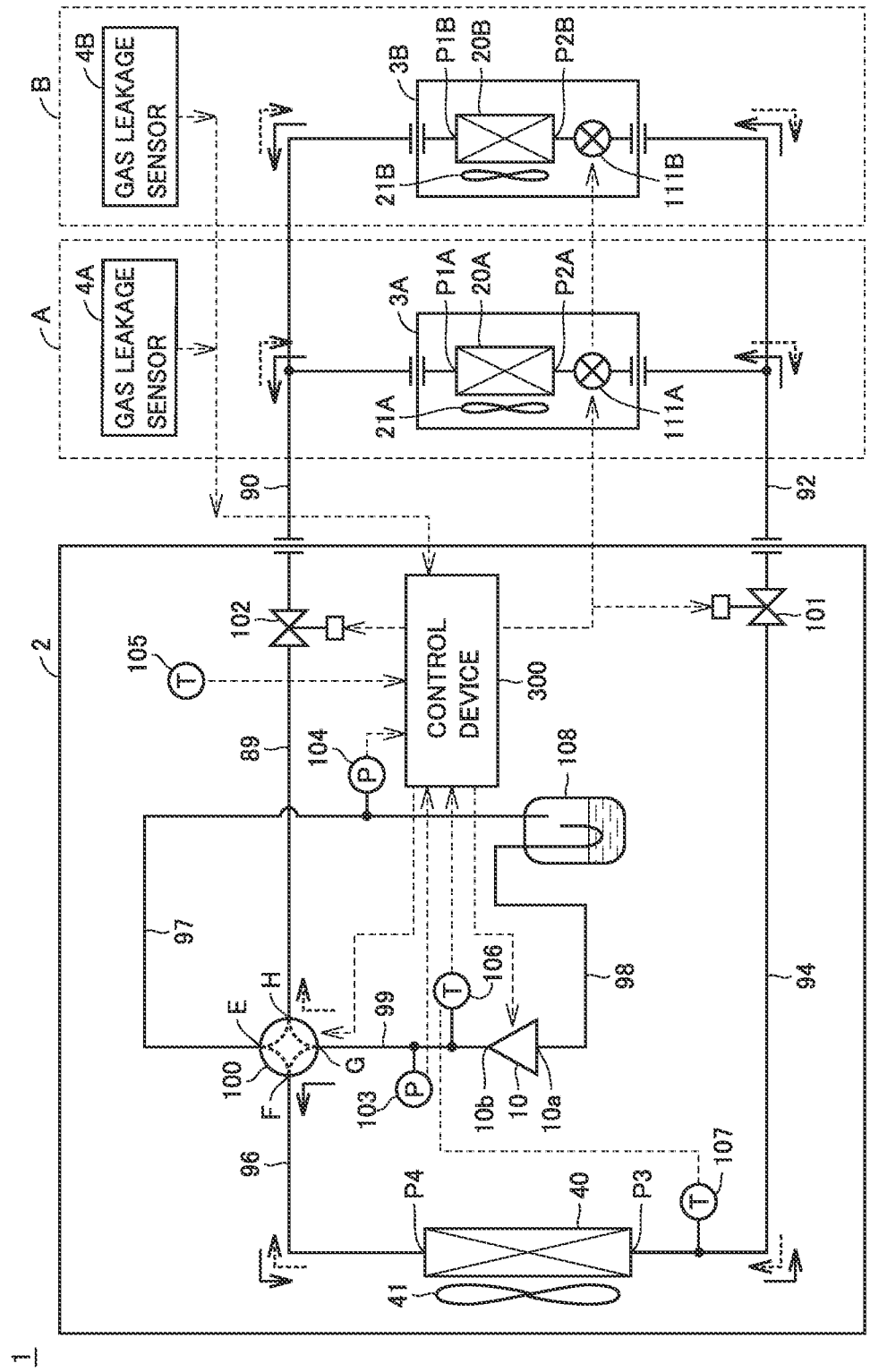
FIG. 1 shows a refrigerant circuit of a refrigeration cycle apparatus 1 according to a first embodiment.

The following describes embodiments of the present invention in detail with reference to figures. In the description below, a plurality of embodiments will be described; however, it is initially expected at the time of filing of the present application to appropriately combine configurations described in the embodiments. It should be noted that the same or corresponding portions in the figures are given the same reference characters and are not described repeatedly.

First Embodiment

FIG. 1 shows a refrigerant circuit of a refrigeration cycle apparatus 1 according to a first embodiment. With reference to FIG. 1, refrigeration cycle apparatus 1 is constituted of: an outdoor unit 2; an indoor unit 3A disposed in a room A; a gas leakage sensor 4A disposed in room A; an indoor unit 3B disposed in a room B; and a gas leakage sensor 4B disposed in room B.

Refrigeration cycle apparatus 1 includes a compressor 10, an accumulator 108, indoor heat exchangers 20A, 20B, linear expansion valves (LEV) 111A, 111B, an outdoor heat exchanger 40, pipes 89, 90, 92, 94, 96, 97, 98, 99, shutoff valves 101, 102, and a four-way valve 100. Four-way valve 100 has ports E to H.

Pipe 89 connects port H of four-way valve 100 to a gas side refrigerant pipe connection opening of the outdoor unit, and is provided with shutoff valve 102 (gas shutoff valve). One end of extension pipe 90 is connected to the gas side refrigerant pipe connection opening of the outdoor unit at the outer side of the outdoor unit. The other ends of pipe 90 are connected to ports P1A, P1B of indoor heat exchangers 20A, 20B.

Indoor heat exchanger 20A is connected to LEV 111A in indoor unit 3A.

Indoor heat exchanger 20B is connected to LEV 111B in indoor unit 3B.

Pipe 92 connects LEV 111A at the port P2A side of indoor heat exchanger 20A and LEV 111B at the port P2B side of indoor heat exchanger 20B to a liquid side refrigerant pipe connection opening of the outdoor unit.

Pipe 94 connects the liquid side refrigerant pipe connection opening of the outdoor unit to port P3 of outdoor heat exchanger 40, and is provided with shutoff valve 101 (liquid shutoff valve).

Pipe 96 connects port P4 of outdoor heat exchanger 40 to port F of four-way valve 100. A refrigerant outlet 10b of compressor 10 is connected to port G of four-way valve 100. Pipe 98 connects a refrigerant inlet 10a of compressor 10 to a refrigerant outlet of accumulator 108. Pipe 97 connects a refrigerant inlet of accumulator 108 to port E of four-way valve 100.

Pipe 99 is connected between refrigerant outlet 10b of compressor 10 and port G of four-way valve 100, and a temperature sensor 106 configured to measure a refrigerant temperature is disposed at pipe 99.

Refrigeration cycle apparatus 1 further includes pressure sensors 103, 104, temperature sensors 105 to 107, and a control device 300. Control device 300 controls compressor 10, four-way valve 100, LEVs 111A, 111B, an outdoor unit fan 41, and indoor unit fans 21A, 21B in accordance with an operation instruction signal provided from a user and outputs of various sensors.

Control device 300 includes a CPU (Central Processing Unit), a storage device, an input/output buffer, and the like (all of which are not shown), and controls four-way valve 100, compressor 10 and LEVs 111A, 111B, and the like in refrigeration cycle apparatus 1. It should be noted that this control is not limited to a process by software, but can be performed by dedicated hardware (electronic circuit).

Compressor 10 is configured to change an operation frequency in accordance with a control signal received from control device 300. By changing the operation frequency of compressor 10, the output of compressor 10 is adjusted. For compressor 10, various types of compressors can be employed, such as a rotary type compressor, a reciprocating type compressor, a scroll type compressor, and a screw type compressor.

In accordance with a control signal received from control device 300, four-way valve 100 is controlled to be brought into one of a state A (cooling operation state) and a state B (heating operation state). In state A, port E communicates with port H and port F communicates with port G. In state B, port E communicates with port F and port H communicates with port G. By operating compressor 10 in state A (cooling operation state), the refrigerant circulates in the refrigerant circuit in a direction indicated by solid line arrows. On the other hand, by operating compressor 10 in state B (heating operation state), the refrigerant circulates in the refrigerant circuit in a direction indicated by broken line arrows.

In accordance with a control signal received from control device 300, a degree of opening of each of LEVs 111A, 111B is controlled to achieve one of a full open state, SH (superheating: degree of superheating) control, SC (subcooling: degree of supercooling) control, and a close state.

A feature of refrigeration cycle apparatus 1 of the present embodiment with the above-described configuration lies in that a liquid sealed state of the outdoor heat exchanger is eliminated while performing an operation (pump down operation) to collect the refrigerant to the outdoor unit during refrigerant leakage. This feature will be described in detail.

In accordance with outputs of gas leakage sensors 4A, 4B, control device 300 controls shutoff valves 101, 102, compressor 10, four-way valve 100, and LEVs 111A, 111B.

Figure 2:
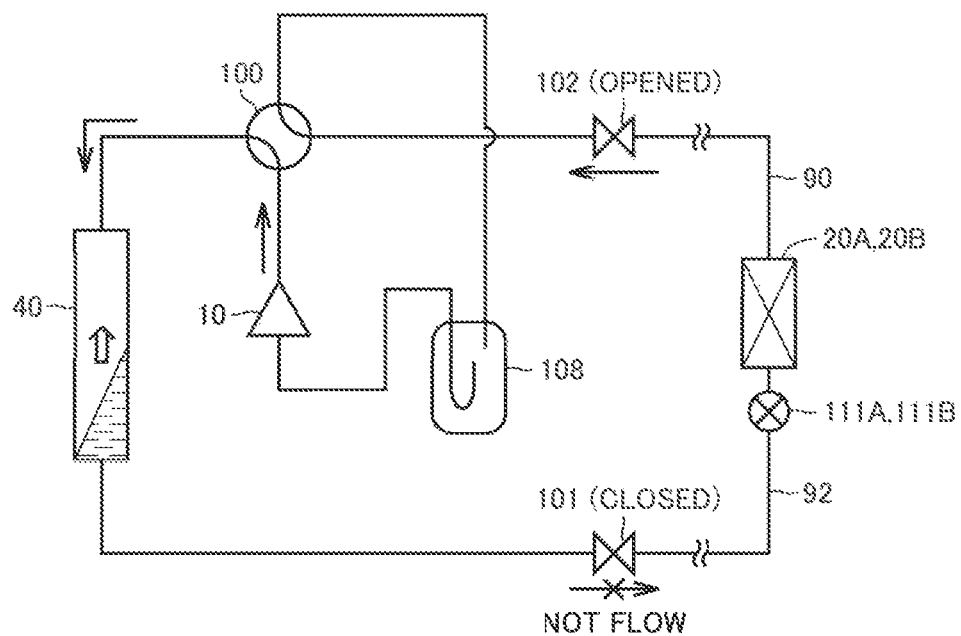
FIG. 2 illustrates a first mode operation during a refrigerant collection operation.

FIG. 2 illustrates a first mode operation during the refrigerant collection operation. With reference to FIG. 2, in the first mode operation, control device 300 operates compressor 10 in such a state that shutoff valve 101 is closed, shutoff valve 102 is opened, LEVs 111A, 111B are in fully open states, and four-way valve 100 is set to the cooling operation state.

Accordingly, the refrigerant in indoor heat exchangers 20A, 20B and pipes 90, 92 are sent by compressor 10 to outdoor heat exchanger 40 via shutoff valve 102 in the open state and accumulator 108, and are condensed. Since shutoff valve 101 is closed, the refrigerant condensed by outdoor heat exchanger 40 is stored in outdoor heat exchanger 40 without modification. An amount of the liquid refrigerant stored in outdoor heat exchanger 40 is increased as the pump down operation is progressed.

Figure 3:
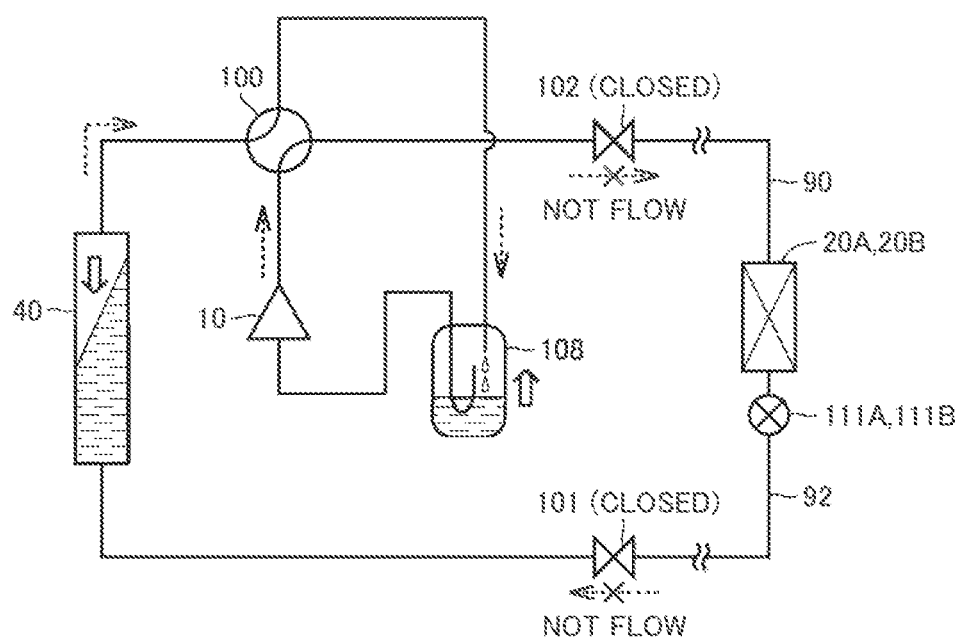
FIG. 3 illustrates a second mode operation during the refrigerant collection operation.

FIG. 3 illustrates a second mode operation during the refrigerant collection operation. With reference to FIG. 3, in the second mode operation, control device 300 operates compressor 10 in such a state that both shutoff valves 101, 102 are closed and four-way valve 100 is set to the heating operation state. Accordingly, the liquid refrigerant temporarily stored in outdoor heat exchanger 40 is sent to accumulator 108. Since the liquid refrigerant is thus moved, the amount of the liquid refrigerant in outdoor heat exchanger 40 is decreased and the amount of the liquid refrigerant in the accumulator is increased.

In the first embodiment, after the refrigerant is collected from indoor heat exchangers 20A, 20B by performing the first mode operation of FIG. 2, the second mode operation described with reference to FIG. 3 is performed to eliminate the liquid sealed state. Accordingly, part of the liquid refrigerant is moved from outdoor heat exchanger 40 to accumulator 108, thereby eliminating the liquid sealed state of outdoor heat exchanger 40. It should be noted that second shutoff valve 102 is not necessarily required to be provided.

The above configurations and operations in FIG. 1 to FIG. 3 will be summarized and described. Refrigeration cycle apparatus 1 includes outdoor heat exchanger 40, compressor 10, accumulator 108, indoor heat exchangers 20A, 20B, expansion valves 111A, 111B, four-way valve 100, first shutoff valve 101, the refrigerant leakage detection device (gas leakage sensors 4A, 4B), and control device 300.

First shutoff valve 101 is provided in first refrigerant passage 94 that connects outdoor heat exchanger 40 to expansion valves 111A, 111B. The refrigerant leakage detection device (gas leakage sensors 4A, 4B) detects refrigerant leakage from the refrigerant circuit that circulates the refrigerant at least through compressor 10, outdoor heat exchanger 40, expansion valves 111A, 111B, and indoor heat exchangers 20A, 20B.

Control device 300 controls four-way valve 100, compressor 10, first shutoff valve 101, and expansion valves 111A, 111B. In the cooling operation state, four-way valve 100 switches the connection of the refrigerant circuit to circulate the refrigerant in order of compressor 10, outdoor heat exchanger 40, first shutoff valve 101, expansion valve 111A, indoor heat exchanger 20A (or expansion valve 111B, indoor heat exchanger 20B), and accumulator 108. In the heating operation state, four-way valve 100 switches the connection of the refrigerant circuit to circulate the refrigerant in order of compressor 10, indoor heat exchanger 20A, expansion valve 111A (or indoor heat exchanger 20B, expansion valve 111B), first shutoff valve 101, outdoor heat exchanger 40, and accumulator 108.

When refrigerant leakage is detected by the refrigerant leakage detection device (gas leakage sensor 4A or 4B), control device 300 performs the first mode operation to operate compressor 10 in such a state that four-way valve 100 is set to the cooling operation state, expansion valves 111A, 111B are opened, and first shutoff valve 101 is closed. After performing the first mode operation, control device 300 performs the second mode operation to operate compressor 10 in such a state that four-way valve 100 is set to the heating operation state and first shutoff valve 101 is closed.

Preferably, refrigeration cycle apparatus 1 further includes pressure sensor 104 configured to detect pressures of indoor heat exchangers 20A, 20B. When refrigerant leakage is detected by the refrigerant leakage detection device (gas leakage sensor 4A or 4B), control device 300 starts the first mode operation. When the refrigerant pressure in each of indoor heat exchangers 20A, 20B becomes lower than a threshold value during the first mode operation, control device 300 switches the first mode operation to the second mode operation, and then stops compressor 10.

Preferably, refrigeration cycle apparatus 1 further includes second shutoff valve 102 provided in second refrigerant passage 89 that connects each of indoor heat exchangers 20A, 20B to four-way valve 100. During the first mode operation and the second mode operation, control device 300 opens second shutoff valve 102. When stopping compressor 10, control device 300 closes second shutoff valve 102.

Figure 4:
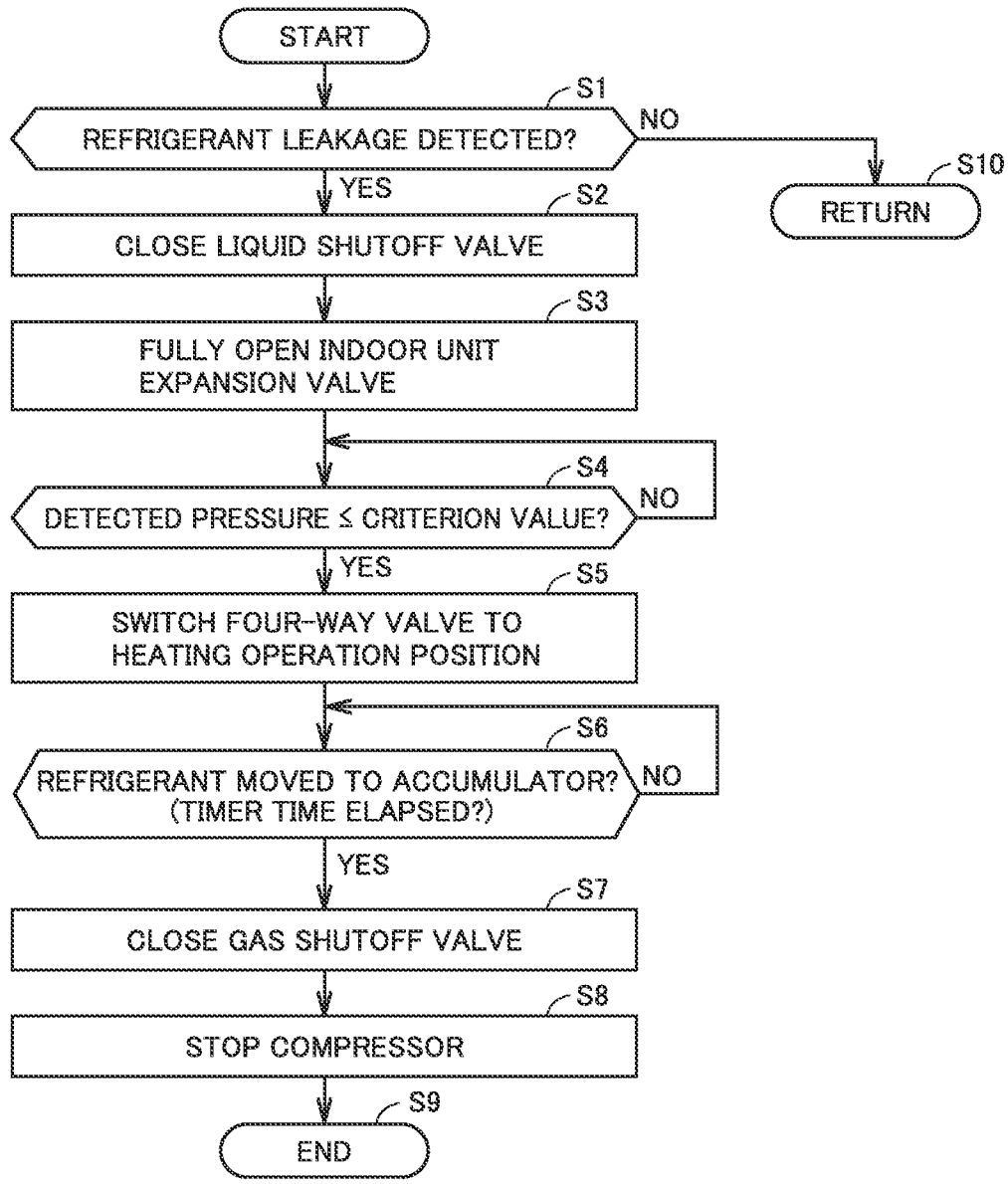
FIG. 4 is a flowchart for illustrating a pump down operation performed in the first embodiment during a cooling operation.

Next, control performed by control device 300 to perform such operations will be described. FIG. 4 is a flowchart for illustrating the pump down operation performed in the first embodiment during the cooling operation. The process of this flowchart is invoked from an air conditioning control main routine and is executed whenever a certain time elapses or a predetermined condition is satisfied.

With reference to FIG. 1 and FIG. 4, in a step S1, control device 300 determines whether or not leakage of the refrigerant gas is detected by gas leakage sensor 4A or gas leakage sensor 4B. When the leakage of the refrigerant gas is not detected in step S1, control device 300 proceeds the process to a step S10 and the control is moved to the main routine.

When the leakage of the refrigerant gas is detected in step S1, control device 300 closes shutoff valve 101 (liquid shutoff valve) in a step S2, and fully opens expansion valves 111A, 111B of indoor units 3A, 3B in a step S3. By operating compressor 10 in this state, the first mode operation shown in FIG. 2 is performed, with the result that the liquid refrigerant is stored in outdoor heat exchanger 40 and the refrigerant is suctioned from indoor heat exchangers 20A, 20B and pipes 92, 90, 89, 97. Accordingly, the pressure detected by pressure sensor 104 is gradually decreased.

In a step S4, control device 300 determines whether or not the pressure detected by pressure sensor 104 becomes less than or equal to a criterion value. The first mode operation shown in FIG. 2 is continued until the detected pressure is decreased to be equal to the criterion value. This criterion value is set to a value indicating that outdoor heat exchanger 40 is nearly full of the liquid refrigerant and the collection of the refrigerant from indoor heat exchangers 20A, 20B and pipes 92, 90, 89, 97 has been completed.

When the detected pressure becomes less than or equal to the criterion value in step S4, control device 300 switches four-way valve 100 from a cooling operation position to a heating operation position in a step S5. Then, in a step S6, control device 300 performs the second mode operation shown in FIG. 3 to move the liquid refrigerant from outdoor heat exchanger 40 to accumulator 108.

The execution time of the process of step S6 is set to a certain predetermined time, or is set in accordance with the amount of the liquid refrigerant stored in accumulator 108 or outdoor heat exchanger 40, or the like. For example, transition is made to a step 7 when the amount of the liquid refrigerant stored in accumulator 108 is detected to be more than or equal to a predetermined amount or when the amount of the liquid refrigerant in outdoor heat exchanger 40 is detected to be less than or equal to a predetermined amount. Alternatively, a time to make transition from step S6 to step S7 may be determined based on estimation from the amount of the liquid refrigerant in accumulator 108 or outdoor heat exchanger 40.

Then, in step S7, control device 300 closes shutoff valve 102 (gas shutoff valve), stops the operation of compressor 10 in a step S8, and ends the process (step S9).

Figure 5:
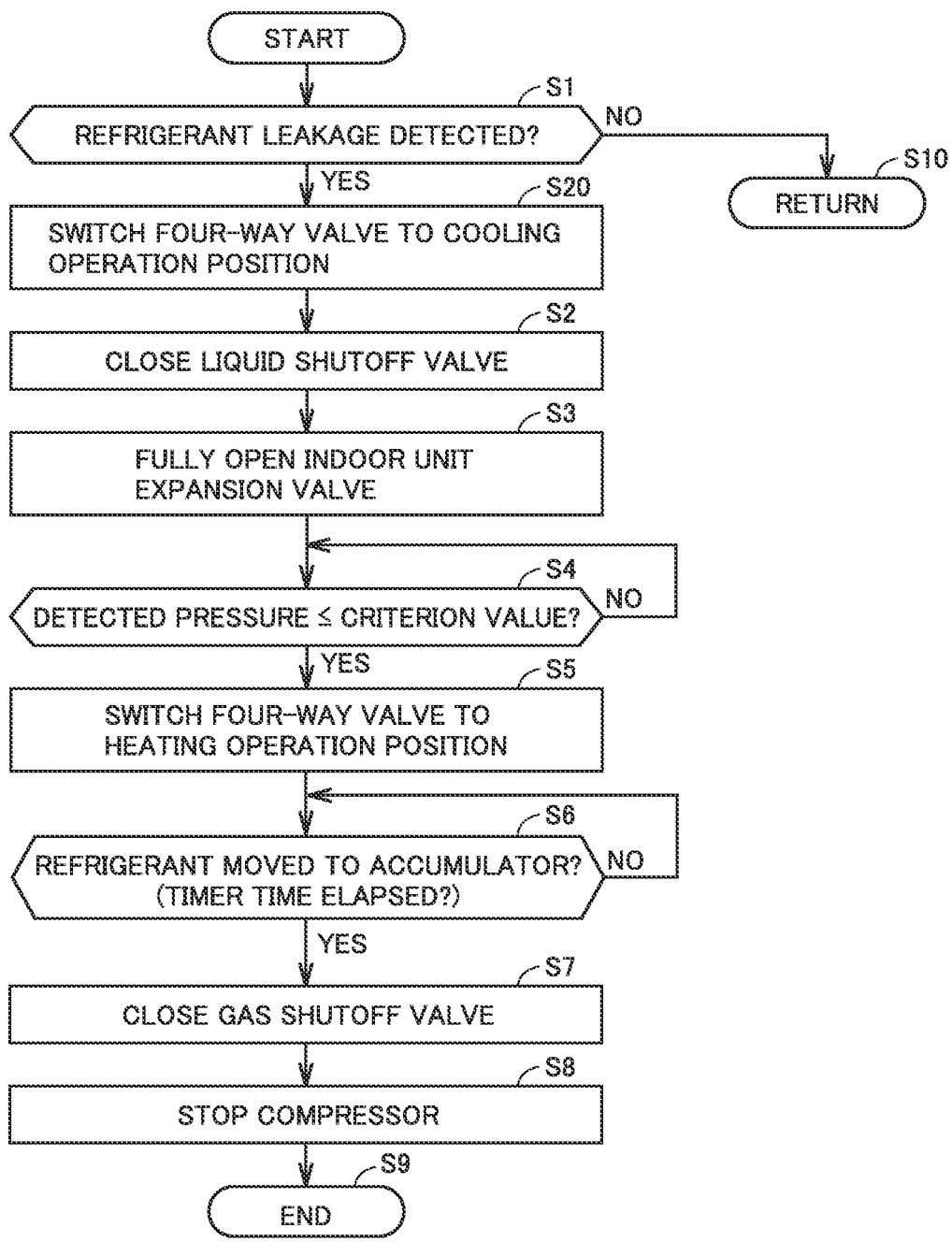
FIG. 5 is a flowchart for illustrating the pump down operation performed in the first embodiment during a heating operation.

FIG. 5 is a flowchart for illustrating the pump down operation performed in the first embodiment during the heating operation. In the process of the pump down operation shown in FIG. 5, a process of a step S20 is added between step S1 and step S2 in the process of the flowchart of FIG. 4. In step S20, four-way valve 100 is switched from the heating operation position to the cooling operation position. The other processes in FIG. 5 are the same as those in FIG. 4, and are therefore not repeatedly described.

As described above, upon completion of the pump down operation, four-way valve 100 is switched to the heating operation position (step S5). By switching four-way valve 100 to the heating operation position, outdoor heat exchanger 40 is connected to accumulator 108 in the refrigerant flow path as shown in FIG. 3, and the liquid refrigerant stored in outdoor heat exchanger 40 is moved into accumulator 108, whereby liquid sealing in outdoor heat exchanger 40 can be prevented.

Figure 6:
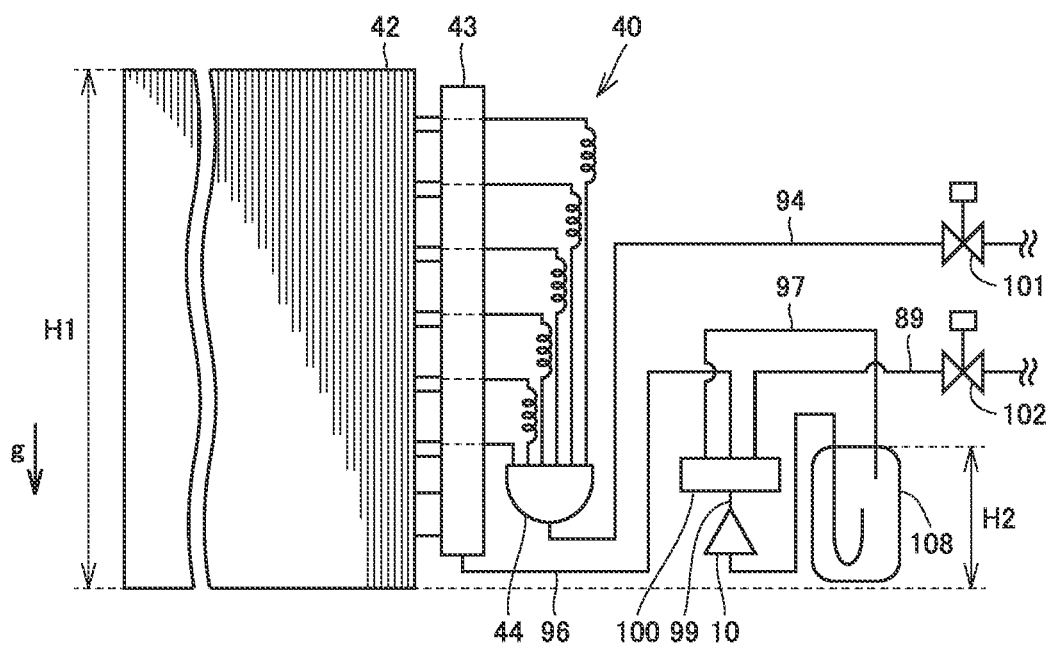
FIG. 6 illustrates an arrangement of each component of the outdoor unit.
Figure 7:
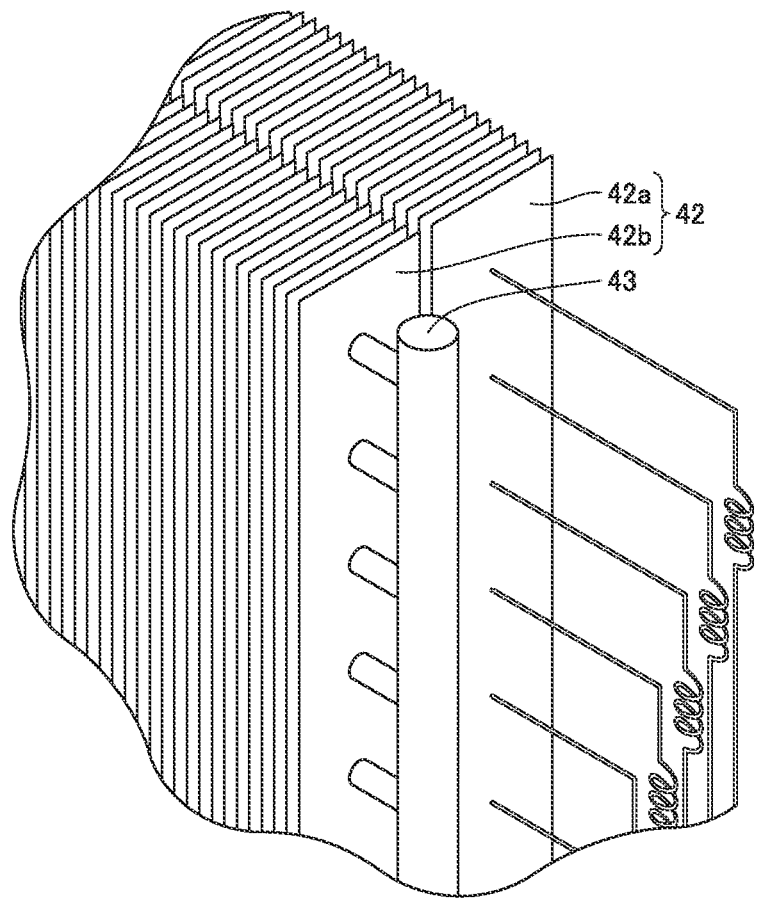
FIG. 7 is an enlarged perspective view showing a portion of FIG. 6.

Next, the following describes an advantageous arrangement of accumulator 108 for the pump down operation performed in the present embodiment. FIG. 6 illustrates an arrangement of each component of the outdoor unit. FIG. 7 is an enlarged perspective view showing a portion of FIG. 6. With reference to FIG. 6 and FIG. 7, outdoor heat exchanger 40 includes a distributor 44, a header 43, and a heat exchange portion 42.

Distributor 44 is disposed between heat exchange portion 42 and shutoff valve 101 (liquid shutoff valve). Header 43 is disposed between heat exchange portion 42 and four-way valve 100. A gravity direction is indicated by an arrow g in FIG. 6. Heat exchange portion 42 includes: a heat exchange portion 42a to which a pipe from distributor 44 is connected; and a heat exchange portion 42b to which a pipe from header 43 is connected. In each of heat exchange portion 42a and heat exchange portion 42b, a plurality of refrigerant flow paths are formed to extend through a multiplicity of heat radiation fins.

It should be noted that heat exchange portion 42a is connected to heat exchange portion 42b by the refrigerant passage at an end surface opposite to the portion shown in FIG. 7. Therefore, when the liquid refrigerant flows from distributor 44 into heat exchange portion 42a (during the heating operation), the two-phase refrigerant flows from heat exchange portion 42a to heat exchange portion 42b and the gas refrigerant flows out from heat exchange portion 42b to header 43. On the other hand, when the gas refrigerant flows from header 43 to heat exchange portion 42b (during the cooling operation), the two-phase refrigerant flows from heat exchange portion 42b to heat exchange portion 42a, and the liquid refrigerant flows out from heat exchange portion 42a to distributor 44.

Here, a height H2 from the bottom surface of the outdoor unit to the upper end portion of accumulator 108 is made smaller than a height H1 of heat exchange portion 42 of outdoor heat exchanger 40. In other words, as shown in FIG. 6, the position (height H1) of the upper end of outdoor heat exchanger 40 is higher than the position (height H2) of the upper end of accumulator 108. By determining the position of accumulator 108 in this way, the liquid refrigerant stored in heat exchange portion 42 at a high position is facilitated to be moved to accumulator 108 due to an influence of gravity, thereby facilitating prevention of liquid sealing in outdoor heat exchanger 40.

Preferably, as shown in FIG. 6, outdoor heat exchanger 40 has header 43 at its refrigerant outlet portion, and refrigerant flow path 96 extending from header 43 to accumulator 108 via four-way valve 100 during the second mode operation is connected to the lower end portion of header 43. That is, pipe 96 that connects header 43 to four-way valve 100 is attached to header 43 at a lower end portion of header 43, preferably, a lower end surface of header 43. By attaching pipe 96 to the lower end portion of header 43, the liquid refrigerant can be facilitated to be moved to accumulator 108.

It should be noted that shutoff valve 102 (gas shutoff valve) may not be provided. By switching four-way valve 100 to the heating operation position, gas pipe 90 is connected to refrigerant outlet 10b of compressor 10. Compressor 10 can block the liquid refrigerant because compressor 10 has a structure for blocking the refrigerant in many cases when the operation of compressor 10 is stopped.

For example, for compressor 10, a low-pressure shell scroll type compressor may be employed. When four-way valve 100 is stopped at the cooling operation position, the liquid refrigerant may be leaked to the indoor side if a large amount of the liquid refrigerant is stored in accumulator 108. By ending the operation after stopping four-way valve 100 at the heating operation position and by providing no shutoff valve 102 (gas shutoff valve), it is possible to implement a low-cost, compact outdoor unit capable of the pump down operation.

Figure 8:
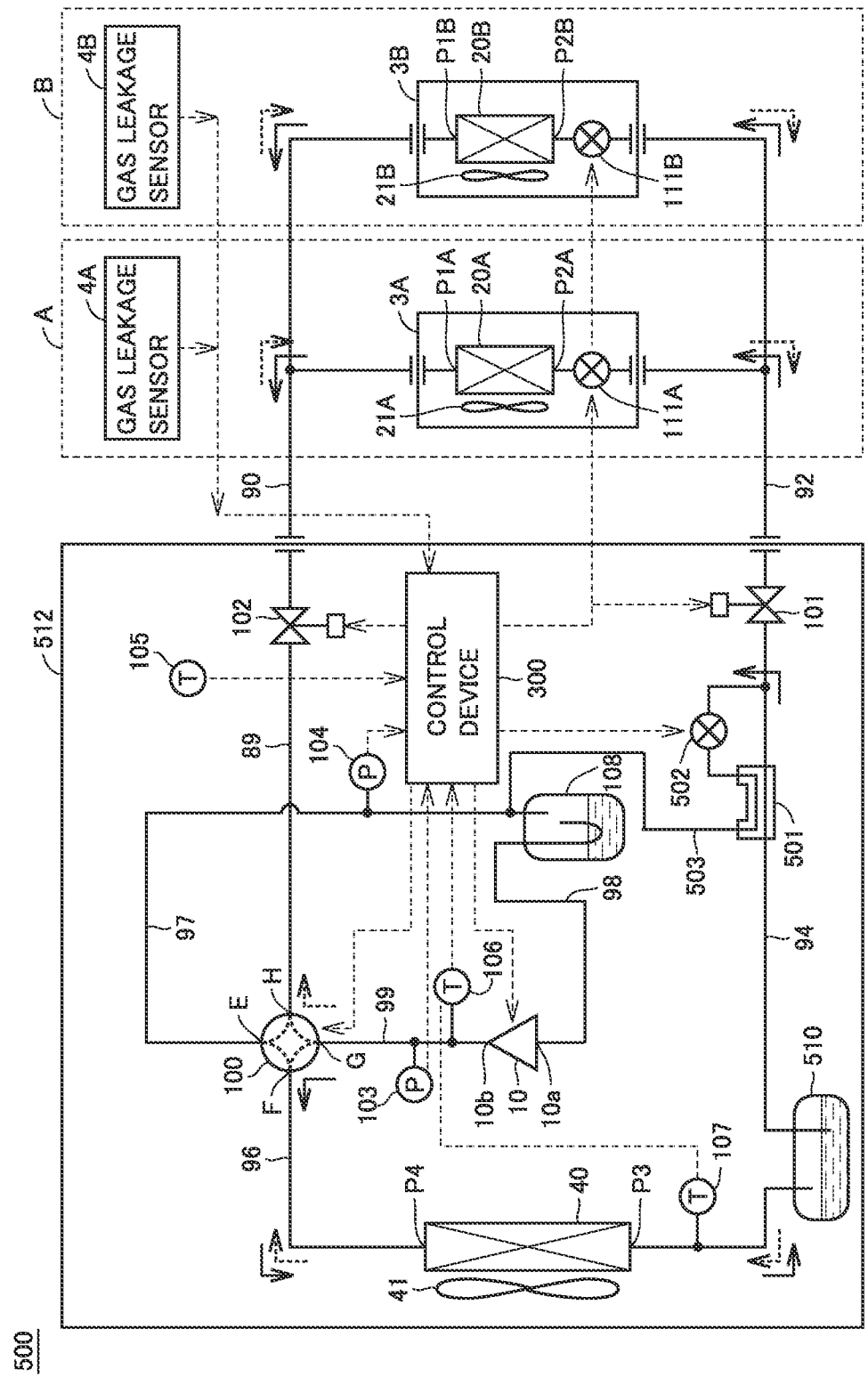
FIG. 8 shows a configuration of a refrigeration cycle apparatus according to a modification of the first embodiment.

FIG. 8 shows a configuration of a refrigeration cycle apparatus according to a modification of the first embodiment. With reference to FIG. 8, in addition to the configuration of refrigeration cycle apparatus 1 shown in FIG. 1, a refrigeration cycle apparatus 500 includes an internal heat exchanger 501, an expansion valve 502, a bypass passage 503, and a receiver 510 disposed at pipe 94. Receiver 510 is provided in the refrigerant circuit between outdoor heat exchanger 40 and each of expansion valves 111A, 111B, and is configured to store the liquid refrigerant.

Pipe 98 connects the refrigerant outlet of accumulator 108 to refrigerant inlet 10a of compressor 10. In the refrigerant circuit, bypass passage 503 bypasses the refrigerant from the refrigerant passage (pipe 94), which connects outdoor heat exchanger 40 to expansion valves 111A, 111B, to the refrigerant inlet of accumulator 108. Expansion valve 502 is provided at bypass passage 503.

Internal heat exchanger 501 is provided in the refrigerant circuit between outdoor heat exchanger 40 and expansion valves 111A, 111B, and is configured to exchange heat between the refrigerant flowing in bypass passage 503 and the refrigerant flowing in third refrigerant passage 94.

By providing receiver 510, an amount of collection of the liquid refrigerant can be increased. Moreover, by detecting that outdoor heat exchanger 40 has become nearly the liquid sealed state, expansion valve 502 may be opened to move the refrigerant to accumulator 108 via bypass passage 503.

As shown in FIG. 8, the refrigerant collection control shown in FIG. 2 to FIG. 5 can be also applied to the configuration having internal heat exchanger 501 and bypass passage 503 and the configuration having receiver 510.

It should be noted that as a method for detecting the amount of the liquid refrigerant in outdoor heat exchanger 40, it is possible to employ a method for making determination in accordance with a discharge side pressure of the compressor, or a method for making determination using a liquid phase portion temperature efficiency c as described in a second embodiment.

Second Embodiment

In the first embodiment, in order to prevent outdoor heat exchanger 40 from being left in the liquid sealed state during the refrigerant collection, part of the liquid refrigerant in outdoor heat exchanger 40 is moved to accumulator 108 after completion of the collection of the refrigerant from the indoor unit. In the second embodiment, on the other hand, a process of storing the liquid refrigerant in outdoor heat exchanger 40 and then moving the liquid refrigerant in outdoor heat exchanger 40 to accumulator 108 during the refrigerant collection is repeatedly performed. The pump down operation as in the second embodiment is effective particularly when an amount of sealed refrigerant is large with respect to the capacity of outdoor heat exchanger 40 to facilitate occurrence of the liquid sealed state during the pump down operation and the capacity of accumulator 108 is large.

In the second embodiment, each of the configurations described with reference to FIG. 1 and FIG. 8 is used for the configuration of the refrigeration cycle apparatus and the process performed by control device 300 is changed. When refrigerant leakage is detected by the refrigerant leakage detection device (gas leakage sensor 4A or 4B), control device 300 repeatedly performs the first mode operation and the second mode operation.

Figure 9:
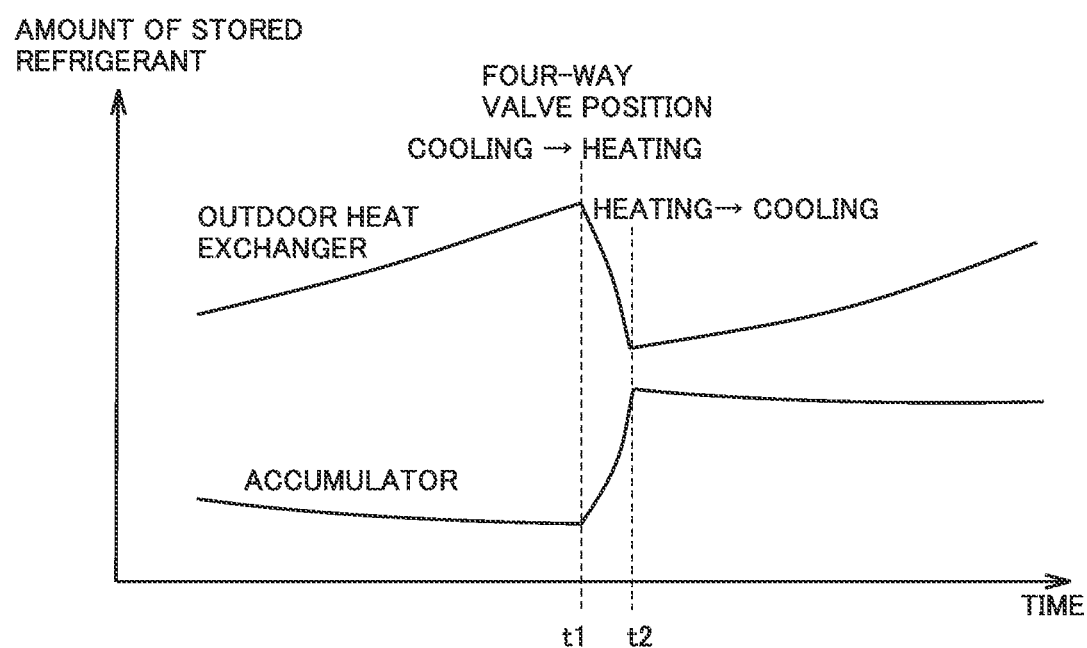
FIG. 9 shows a change in amount of refrigerant stored in each of an outdoor heat exchanger and an accumulator in a second embodiment.

FIG. 9 shows a change in amount of the refrigerant stored in each of the outdoor heat exchanger and the accumulator in the second embodiment. When the first mode operation shown in FIG. 2 is started, the amount of the refrigerant stored in outdoor heat exchanger 40 is increased. When the amount of the refrigerant stored in outdoor heat exchanger 40 reaches a predetermined amount, outdoor heat exchanger 40 becomes nearly the liquid sealed state, with the result that the refrigerant cannot be stored further in outdoor heat exchanger 40.

To address this, in the second embodiment, the position of the four-way valve is temporarily changed from the cooling position to the heating position to switch from the first mode operation shown in FIG. 2 to the second mode operation. Accordingly, the amount of the liquid refrigerant in outdoor heat exchanger 40 is decreased and the amount of the liquid refrigerant in accumulator 108 is increased. Then, when the amount of the refrigerant stored in outdoor heat exchanger 40 is decreased to an amount with which the first mode operation can be performed again, the position of the four-way valve is changed from the heating position to the cooling position again and the collection of the refrigerant is further continued.

By inserting the second mode operation as shown in FIG. 9, the liquid refrigerant can be stored in accumulator 108, whereby the amount of collection of the refrigerant during the pump down operation can be increased. Next, control performed by control device 300 to perform such operations will be described.

Figure 10:
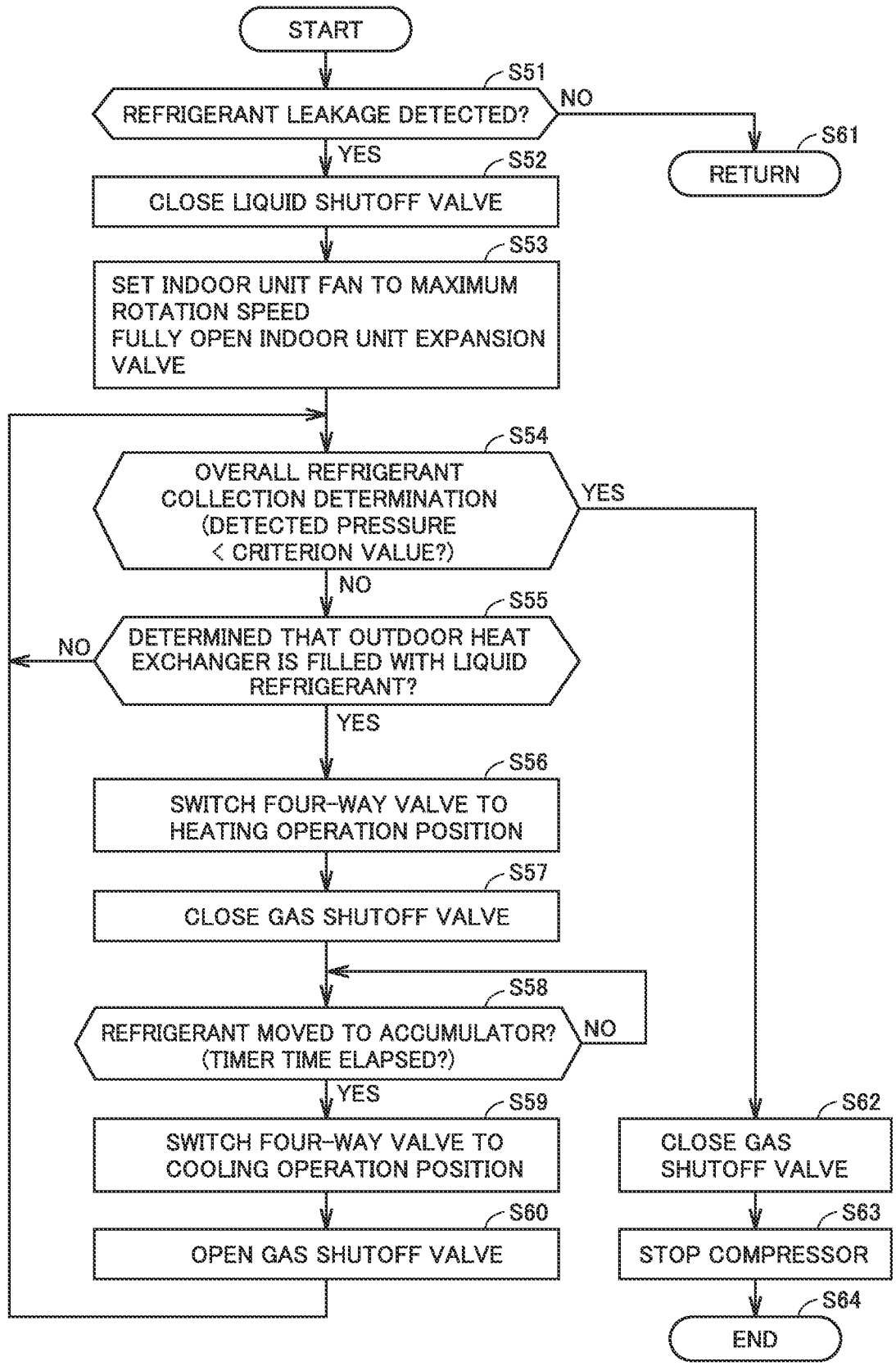
FIG. 10 is a flowchart for illustrating the pump down operation performed in the second embodiment during the cooling operation.

FIG. 10 is a flowchart for illustrating the pump down operation performed in the second embodiment during the cooling operation. The process of this flowchart is invoked from an air conditioning control main routine and is executed whenever a certain time elapses or a predetermined condition is satisfied.

With reference to FIG. 1 and FIG. 10, in a step S51, control device 300 determines whether or not leakage of the refrigerant gas has been detected by gas leakage sensor 4A or gas leakage sensor 4B. When the leakage of the refrigerant gas has not been detected in step SM, control device 300 proceeds the process to a step S61 and the control is moved to the main routine.

When the leakage of the refrigerant gas is detected in step S51, control device 300 closes shutoff valve 101 (liquid shutoff valve) in a step S52, and sets each of indoor unit fans 21A, 21B to a maximum rotation speed and fully opens expansion valves 111A, 111B of indoor units 3A, 3B in a step S53.

By operating compressor 10 in this state, the first mode operation shown in FIG. 2 is performed, with the result that the liquid refrigerant is stored in outdoor heat exchanger 40 and the refrigerant is suctioned from indoor heat exchangers 20A, 20B and pipes 92, 90, 89, 97. Accordingly, the pressure detected by pressure sensor 104 is gradually decreased.

In a step S54, control device 300 determines whether or not the collection of the refrigerant from each of indoor heat exchangers 20A, 20B has been completed. A condition for this determination will be referred to as "overall refrigerant collection determination condition". The overall refrigerant collection determination condition can be such a condition that the pressure detected by pressure sensor 104 has become smaller than a criterion value. When the pressure detected by pressure sensor 104 is more than or equal to the criterion value, it is indicated that the collection of the refrigerant from each of indoor heat exchangers 20A, 20B has not been completed yet. This criterion value is set to a value indicating that the collection of the refrigerant from each of indoor heat exchangers 20A, 20B and pipes 92, 90, 89, 97 has been completed.

When the overall refrigerant collection determination condition is not satisfied in step S54, control device 300 proceeds the process to a step S55. In step S55, control device 300 determines whether or not the liquid refrigerant is stored in outdoor heat exchanger 40.

Here, as the method for detecting the amount of the liquid refrigerant in outdoor heat exchanger 40, it is possible to employ the method for making determination based on the discharge side pressure of compressor 1 or the method using liquid phase portion temperature efficiency $\varepsilon_{sc}$.

First, the method for making determination based on discharge side pressure Pd of compressor 1 will be described. When discharge side pressure Pd becomes more than a predetermined value during the pump down operation, it is determined that the amount of the liquid refrigerant in outdoor heat exchanger 40 has become nearly full. This is due to the following reason: as discharge side pressure Pd becomes higher, a degree of supercooling of outdoor heat exchanger 40 generally becomes larger.

For example, when an R32 refrigerant is used as a slightly flammable refrigerant, a criterion threshold value is set to a pressure (3.8 MPa) lower by about 10% than a value of a designed pressure for air conditioners, i.e., about 4.2 MPa. Accordingly, when discharge side pressure Pd becomes more than the criterion threshold value during the pump down operation, it can be determined that the assumed amount of the liquid refrigerant is stored in outdoor heat exchanger 40.

Next, the following describes the method for making determination using liquid phase portion temperature efficiency $\varepsilon_{sc}$. Liquid phase portion temperature efficiency $\varepsilon_{sc}$ has a value between 0 and 1. When $\varepsilon_{sc}=1$, it is indicated that outdoor heat exchanger 40 is filled with the liquid refrigerant. It is assumed that Tc indicates a temperature of the refrigerant at the inlet side of outdoor heat exchanger 40, Te indicates a temperature of the refrigerant at the outlet side of outdoor heat exchanger 40, and Ta indicates an air temperature. On this occasion, liquid phase portion temperature efficiency c of outdoor heat exchanger 40 is represented by the following formula (1):

$$\varepsilon_{sc}=(Tc-Te)/(Tc-Ta) \qquad (1)$$

When liquid phase portion temperature efficiency Esc is larger than 0.9, it is indicated that the assumed amount of the liquid refrigerant is stored in outdoor heat exchanger 40.

Control device 300 calculates liquid phase portion temperature efficiency $\varepsilon_{sc}$ based on the formula (1). When $\varepsilon_{sc}$ is larger than the criterion value, control device 300 switches the first mode operation to the second mode operation. Then, after passage of a predetermined time, control device 300 switches the second mode operation to the first mode operation.

Control device 300 calculates liquid phase portion temperature efficiency c based on the formula (1). When $\varepsilon_{sc}$ is larger than the criterion value (for example, 0.9), control device 300 switches the first mode operation to the second mode operation in steps S56 to S58 so as to collect the refrigerant to accumulator 108.

Specifically, when the liquid full state determination condition for outdoor heat exchanger 40 (Pd>Pth or $\varepsilon_{sc}$>0.9) is not satisfied in step S55, control device 300 returns the process to step S54 to continue the first mode operation shown in FIG. 2 while monitoring whether or not the overall refrigerant collection determination condition is satisfied. It should be noted that the timing of switching the first mode operation to the second mode operation may not be based on the determination made as being in the liquid full state. The switching may be made at a time at which the liquid refrigerant is assumed to be full. Alternatively, the switching may be made under such a condition that the liquid refrigerant is not full.

On the other hand, when the liquid full state determination condition in outdoor heat exchanger 40 (Pd>Pth or $\varepsilon_{sc}$>0.9) is satisfied in step S55, control device 300 switches four-way valve 100 from the cooling operation position to the heating operation position in a step S56. Then, control device 300 closes shutoff valve 102 (gas shutoff valve) in a step S57, and performs the second mode operation shown in FIG. 3 in subsequent step S58, thereby moving the liquid refrigerant from outdoor heat exchanger 40 to accumulator 108.

The process of step S58 is performed at a predetermined time using a timer. It should be noted that a time to make transition from step S58 to step S59 may be determined by detecting or estimating that the amount of the liquid refrigerant in outdoor heat exchanger 40 has been decreased, based on such a fact that Esc shown in the formula (1) has become less than or equal to a predetermined value.

In step S59, control device 300 switches four-way valve 100 from the heating operation position to the cooling operation position. Then, in a step S60, control device 300 opens shutoff valve 102 (gas shutoff valve). Accordingly, the refrigerant collection from the indoor unit side can be performed by the first mode operation again, and the process is returned to step S54 again to monitor whether or not the overall refrigerant collection determination condition is satisfied.

When the overall refrigerant collection determination condition is satisfied in step S54 (YES in S54), control device 300 proceeds the process to a step S62. Control device 300 closes shutoff valve 102 (gas shutoff valve) in step S62, and stops the operation of compressor 10 in a subsequent step S63 to end the process of this flowchart. It should be noted that as with the flowchart of FIG. 4, expansion valves 111A, 111B may be closed after step S63 and then the process may be ended.

Figure 11:
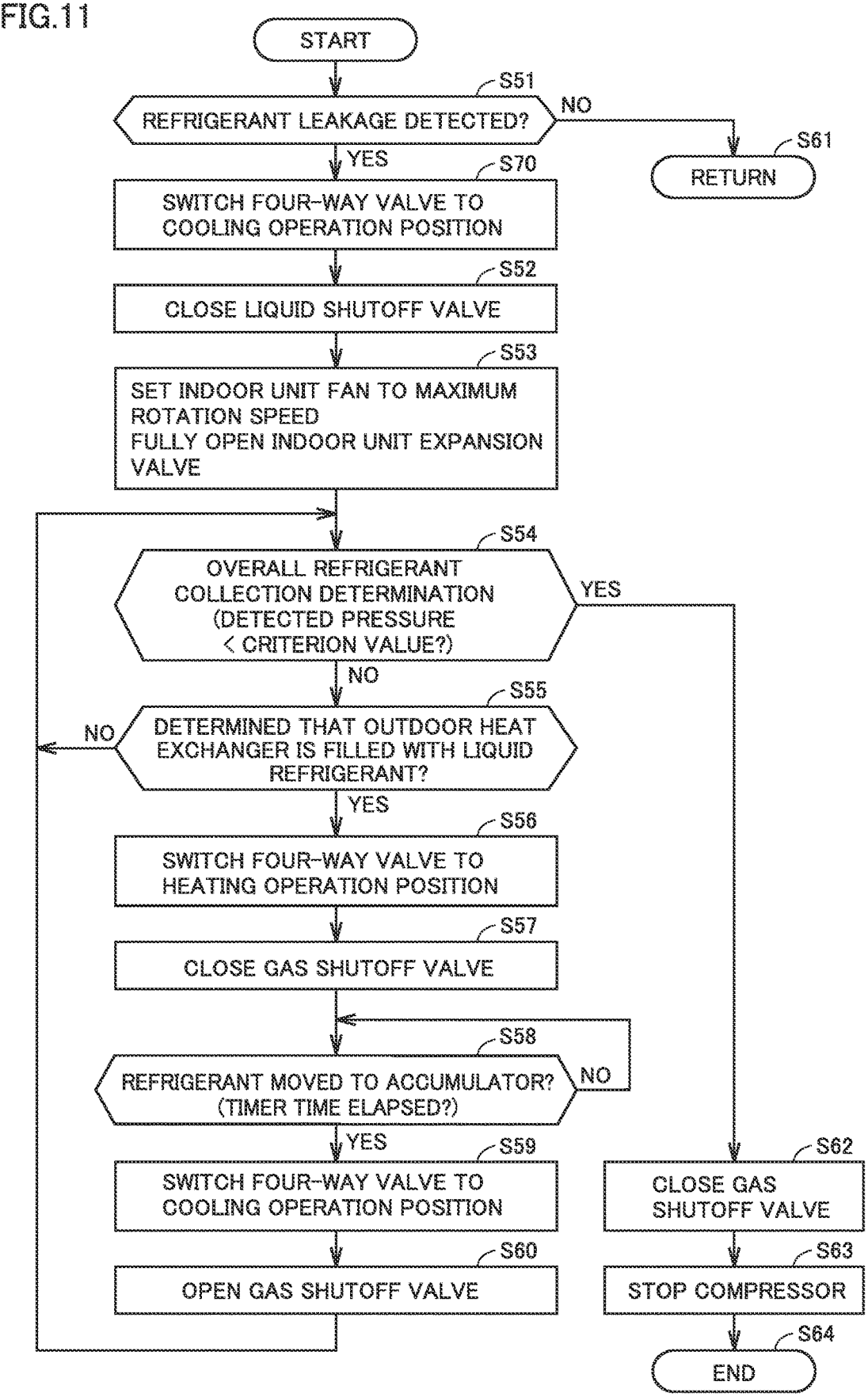
FIG. 11 is a flowchart for illustrating the pump down operation performed in the second embodiment during the heating operation.

FIG. 11 is a flowchart for illustrating the pump down operation performed in the second embodiment during the heating operation. In the process of the pump down operation shown in FIG. 11, a process of a step S70 is added between step S51 and step S52 in the process of the flowchart of FIG. 10. In step S70, four-way valve 100 is switched from the heating operation position to the cooling operation position. The other processes in FIG. 11 are the same as those in FIG. 10, and are therefore not repeatedly described.

Modification

Figure 12:
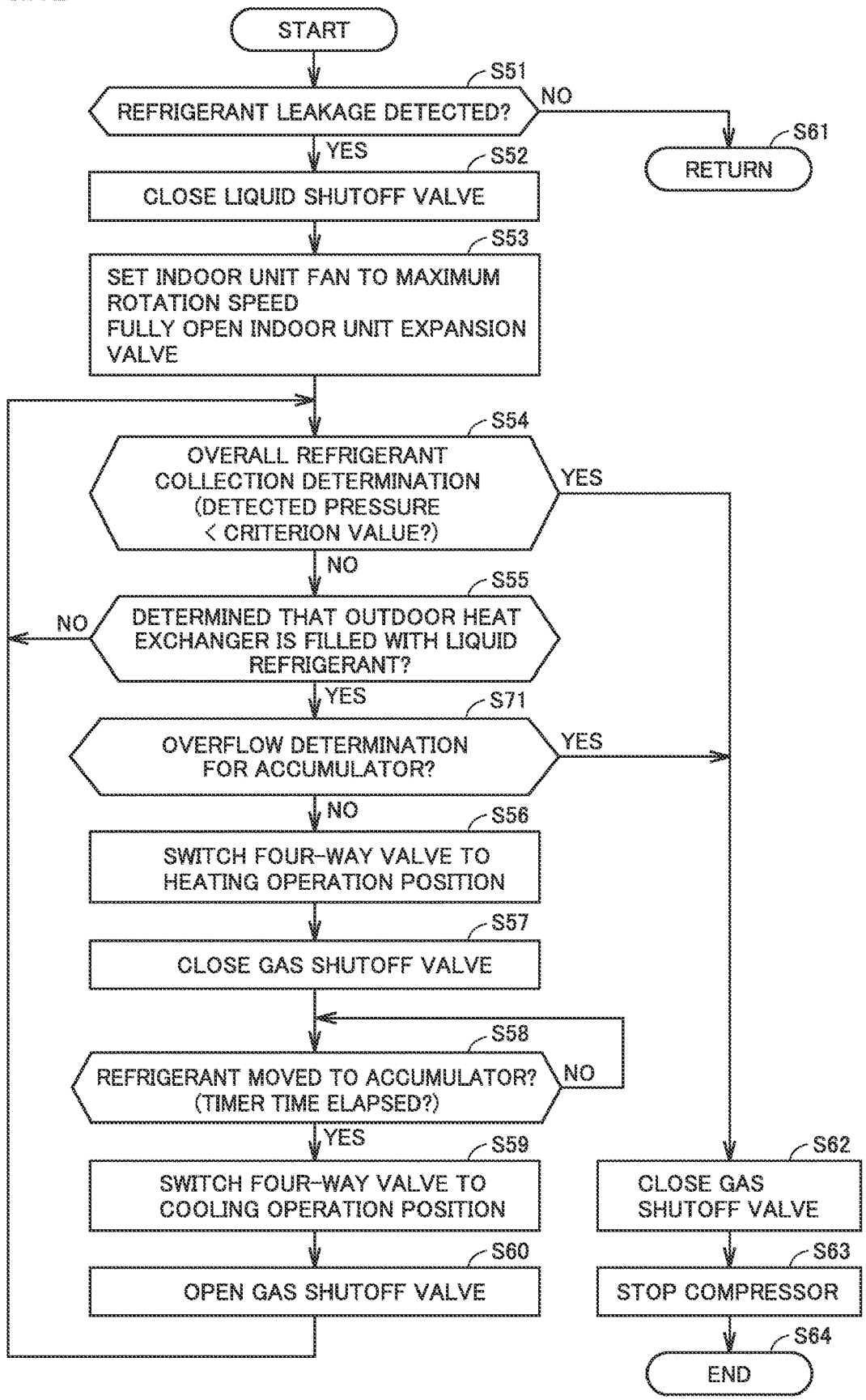
FIG. 12 is a flowchart for illustrating the pump down operation performed in a modification of the second embodiment during the cooling operation.

FIG. 12 is a flowchart for illustrating the pump down operation performed in a modification of the second embodiment during the cooling operation.

In the process of the pump down operation shown in FIG. 12, a process of a step S71 is added between step S55 and step S56 in the process of the flowchart of FIG. 10. In step S71, control device 300 performs an overflow determination to determine whether or not accumulator 108 is in the liquid full state.

In the overflow determination for accumulator 108, it may be determined that the amount of the refrigerant in the accumulator becomes more than a predetermined amount in accordance with a measurement value of a liquid level sensor provided in accumulator 108, or it may be determined that the amount of the refrigerant becomes more than a predetermined amount when the degree of superheating (SH) of the suctioned refrigerant is decreased to fall below a setting value, for example. Alternatively, it may be determined that the amount of the refrigerant becomes more than a predetermined amount when the shell temperature of a low-pressure shell compressor is decreased to fall below a setting value.

When accumulator 108 is not in the liquid full state in step S71, the process proceeds to step S56 to perform the process of moving the liquid refrigerant to accumulator 108. On the other hand, when the accumulator is in the liquid full state in S71, the process proceeds to step S62 to perform a process of ending the pump down operation. It should be noted that the other processes in FIG. 13 are the same as those in FIG. 12, and are therefore not repeatedly described.

FIG. 13 is a flowchart for illustrating the pump down operation performed in the modification of the second embodiment during the heating operation. In the process of the pump down operation shown in FIG. 13, a process of a step S70 is added between step S51 and step S52 in the process of the flowchart of FIG. 12. In step S70, four-way valve 100 is switched from the heating operation position to the cooling operation position. The other processes in FIG. 13 are the same as those in FIG. 12, and are therefore not repeatedly described.

It should be noted that each of refrigeration cycle apparatuses 1 and 500 respectively disclosed in the first and second embodiments may further include a sensor configured to detect the amount of the refrigerant stored in outdoor heat exchanger 40. For example, as this sensor, a liquid level sensor (various types of level sensors such as a magnetic type level sensor, a capacitive type level sensor, an electrode type level sensor, and an ultrasonic type level sensor) can be used to detect the liquid level at the header portion. Control device 300 can switch the first mode operation to the second mode operation based on an output of this sensor.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

The invention claimed is:

1. A refrigeration cycle apparatus comprising:
an outdoor heat exchanger;
a compressor;

an accumulator;
an indoor heat exchanger;
an expansion valve;
a four-way valve connected to an outlet of the compressor, an inlet of the accumulator, the outdoor heat exchanger, and the indoor heat exchanger;
a refrigerant circuit configured to circulate a refrigerant through the compressor, the outdoor heat exchanger, the expansion valve, and the indoor heat exchanger;
a first shutoff valve provided between the outdoor heat exchanger and the expansion valve in the refrigerant circuit;
a refrigerant leakage detection device configured to detect refrigerant leakage from the refrigerant circuit, and
a controller configured to control operation of at least the compressor, the expansion valve, the four-way valve, and the first shutoff valve, wherein:
when the refrigerant leakage is detected by the refrigerant leakage detection device, the controller performs control by a first mode operation where:
the compressor operates such that the refrigerant flows in order of the indoor heat exchanger, the accumulator, the compressor, and the outdoor heat exchanger,
the expansion valve is opened, and
the first shutoff valve is closed,
after the controller performs control by the first mode operation, the controller performs control by a second mode operation where:
the compressor operates such that the refrigerant flows in order of the outdoor heat exchanger and the accumulator, and
the first shutoff valve is closed, and
a position of an upper end of the outdoor heat exchanger is higher than a position of an upper end of the accumulator.

2. The refrigeration cycle apparatus according to claim 1, further comprising
a first pressure detection device configured to detect a pressure of the indoor heat exchanger, wherein
when the refrigerant leakage is detected by the refrigerant leakage detection device, control performed by the first mode operation is started, and
when the pressure detected by the first pressure detection device becomes lower than a first threshold value, control performed by the first mode operation is switched to control performed by the second mode operation and the compressor is then stopped.

3. The refrigeration cycle apparatus according to claim 2, further comprising
a second pressure detection device configured to detect a pressure of a discharge side of the compressor, wherein
when the pressure detected by the second pressure detection device is higher than a second threshold value, control performed by the first mode operation is switched to control performed by the second mode operation.

4. The refrigeration cycle apparatus according to claim 2, wherein
a liquid phase portion temperature efficiency $\varepsilon_{sc}$ of the outdoor heat exchanger is represented by the following formula:

$$\varepsilon_{sc}=(Tc-Te)/(Tc-Ta),$$

where Tc indicates an inlet side temperature of the refrigerant, Te indicates an outlet side temperature of the refrigerant, and Ta indicates an air temperature, and when the liquid phase portion temperature efficiency $\varepsilon_{sc}$ is larger than a criterion value, control performed by the first mode operation is switched to control performed the second mode operation.

5. The refrigeration cycle apparatus according to claim 1, wherein
when the refrigerant leakage is detected by the refrigerant leakage detection device, control performed by the first mode operation and control performed by the second mode operation are repeatedly performed.

6. The refrigeration cycle apparatus according to claim 5, further comprising
a pressure detection device configured to detect a pressure of a discharge side of the compressor, wherein
when the pressure detected by the second pressure detection device is higher than a second threshold value, control performed by the first mode operation is switched to control performed by the second mode operation and then control performed by the second mode operation is switched to control performed by the first mode operation after passage of a predetermined time.

7. The refrigeration cycle apparatus according to claim 5, wherein
a liquid phase portion temperature efficiency $\varepsilon_{sc}$ of the outdoor heat exchanger is represented by the following formula:

$$\varepsilon_{sc}=(Tc-Te)/(Tc-Ta),$$

where Tc indicates an inlet side temperature of the refrigerant, Te indicates an outlet side temperature of the refrigerant, and Ta indicates an air temperature, and when the liquid phase portion temperature efficiency $\varepsilon_{sc}$ is larger than a criterion value, control performed by the first mode operation is switched to control performed by the second mode operation and then control performed by the second mode operation is switched to control performed by the first mode operation after passage of a predetermined time.

8. The refrigeration cycle apparatus according to claim 1, further comprising
a second shutoff valve provided between the indoor heat exchanger and the four-way valve in the refrigerant circuit, wherein
the second shutoff valve is opened during control performed by the first mode operation and control performed by the second mode operation, and
the second shutoff valve is closed when stopping the compressor.

9. The refrigeration cycle apparatus according to claim 1, further comprising
a receiver provided between the outdoor heat exchanger and the expansion valve in the refrigerant circuit and configured to store a liquid refrigerant.

10. A refrigeration cycle apparatus comprising:
an outdoor heat exchanger;
a compressor;
an accumulator;
an indoor heat exchanger;
an expansion valve;
a four-way valve connected to an outlet of the compressor, an inlet of the accumulator, the outdoor heat exchanger, and the indoor heat exchanger;
a refrigerant circuit configured to circulate a refrigerant through the compressor, the outdoor heat exchanger, the expansion valve, and the indoor heat exchanger;

a first shutoff valve provided between the outdoor heat exchanger and the expansion valve in the refrigerant circuit;
a refrigerant leakage detection device configured to detect refrigerant leakage from the refrigerant circuit, and
a controller configured to control operation of at least the compressor, the expansion valve, the four-way valve, and the first shutoff valve, wherein:
when the refrigerant leakage is detected by the refrigerant leakage detection device, the controller performs control by a first mode operation where:
 the compressor operates such that the refrigerant flows in order of the indoor heat exchanger, the accumulator, the compressor, and the outdoor heat exchanger,
 the expansion valve is opened, and
 the first shutoff valve is closed,
after the controller performs control by the first mode operation, the controller performs control by a second mode operation where:
 the compressor operates such that the refrigerant flows in order of the outdoor heat exchanger and the accumulator, and
 the first shutoff valve is closed, and
the refrigeration cycle apparatus further comprises:
 a bypass passage configured to bypass the refrigerant to the accumulator from between the outdoor heat exchanger and the expansion valve in the refrigerant circuit; and
 an internal heat exchanger provided between the outdoor heat exchanger and the expansion valve in the refrigerant circuit and configured to exchange heat between the refrigerant flowing in the bypass passage and the refrigerant flowing between the outdoor heat exchanger and the expansion valve.

11. A refrigeration cycle apparatus comprising:
an outdoor heat exchanger;
a compressor;
an accumulator;
an indoor heat exchanger;
an expansion valve;
a four-way valve connected to an outlet of the compressor, an inlet of the accumulator, the outdoor heat exchanger, and the indoor heat exchanger;
a refrigerant circuit configured to circulate a refrigerant through the compressor, the outdoor heat exchanger, the expansion valve, and the indoor heat exchanger;
a first shutoff valve provided between the outdoor heat exchanger and the expansion valve in the refrigerant circuit;
a refrigerant leakage detection device configured to detect refrigerant leakage from the refrigerant circuit, and
a controller configured to control operation of at least the compressor, the expansion valve, the four-way valve, and the first shutoff valve, wherein:
when the refrigerant leakage is detected by the refrigerant leakage detection device, the controller performs control by a first mode operation where:
 the compressor operates such that the refrigerant flows in order of the indoor heat exchanger, the accumulator, the compressor, and the outdoor heat exchanger,
 the expansion valve is opened, and
 the first shutoff valve is closed,
after the controller performs control by the first mode operation, the controller performs control by a second mode operation where:
 the compressor operates such that the refrigerant flows in order of the outdoor heat exchanger and the accumulator, and
 the first shutoff valve is closed,
the outdoor heat exchanger has a header at a refrigerant outlet portion, and
during control performed by the second mode operation, a refrigerant flow path extending from the header to the accumulator via the four-way valve is connected to a lower end portion of the header.

12. The refrigeration cycle apparatus according to claim 1, wherein
when the refrigerant leakage is detected by the refrigerant leakage detection device during a heating operation, control performed by the first mode operation is performed after switching the four-way valve from a heating operation state to a cooling operation state.

* * * * *